Oct. 30, 1945. W. O. DEMUTH 2,387,982
CONTAINER HOLDER
Filed July 8, 1943
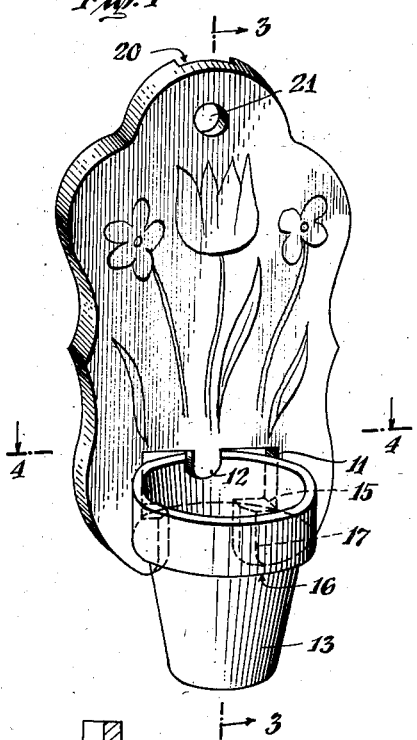
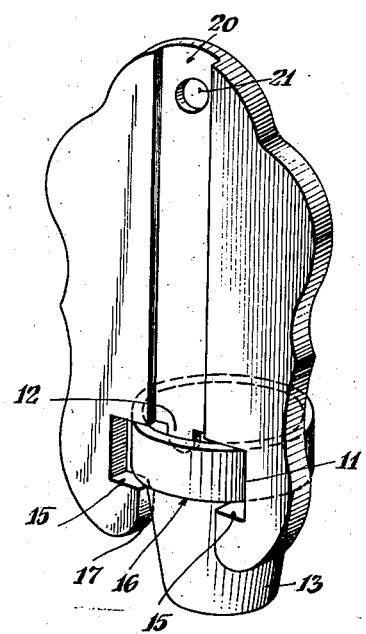
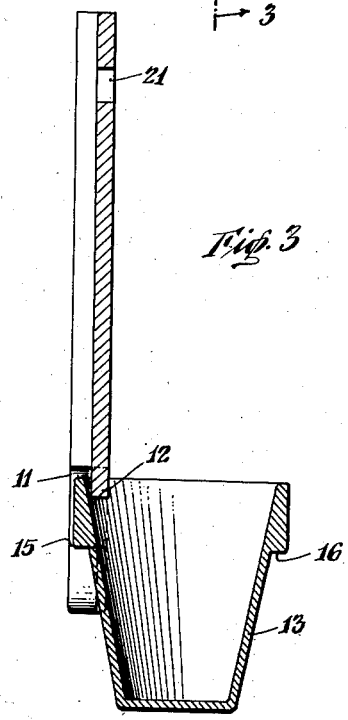
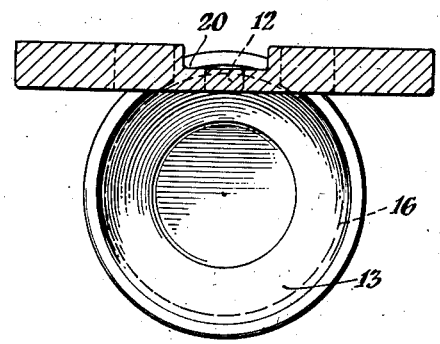
INVENTOR.
Wilbur O. Demuth
BY Bohleber, Fassett & Montstream
ATTORNEYS Patented Oct. 30, 1945

2,387,982

UNITED STATES PATENT OFFICE 2,387,982

CONTAINER HOLDER

Wilbur O. Demuth, Gnadenhutten, Ohio, assignor to The Bowerston Shale Company, Bowerston, Ohio, a corporation of Ohio Application July 8, 1943, Serial No. 493,886

5 Claims. (Cl. 248—311)

The invention relates to a plaque for holding a container. The plaque is intended primarily to removably support a flower pot, the plaque being suitable for mounting upon a wall of any kind. The plaque and flower pot form a suitable decorative means for securing or retaining a flower pot with growing plants therein upon a wall.

It is an object of the invention to construct a plaque of new and novel form for removably supporting a container.

Another object is to construct a new and novel combination of plaque for supporting a container and the container.

Other objects of the invention will be more apparent from the following description taken in connection with the accompanying drawing showing a preferred embodiment of the invention in which:

Figure 1 is a perspective view of the plaque and a flower pot container carried thereby taken substantially from the front thereof.

Figure 2 is a perspective view looking at the back of the plaque carrying a flower pot container.

Figure 3 is a section taken on line 3—3 of Figure 1.

Figure 4 is a section taken on line 4—4 of Figure 1.

In the decorative treatment of exterior porches, walls and the like with growing plants, the container holders have been of many forms and mostly of metallic material. These are subject to weathering by the elements and consequently a flower pot or container holder which can be made of a material which does not weather and rust has many advantages. The invention herein although having advantages for exterior use are also applicable for interior use.

The container holder of the invention includes a plaque 10 of substantial thickness. It may be made of any suitable material although a baked clay plaque will not rust or be affected in any way by the elements, is an inexpensive material and lends itself to mass production methods. The front of the plaque may be suitably decorated by designs formed in the material itself or by painting or by both, designs pressed therein and painting. The outline of the plaque also may be in any suitable decorative design.

The plaque has a recess 11 which in the particular construction illustrated passes entirely through the thickness thereof. A projection 12 extends downwardly from the top of the recess which is preferably integral with the plaque. The inner face of the projection is spaced from the back face of the plaque so that there is ample room to receive the wall of a container 13. The container may be of any desirable kind and shape for holding water or soil, a circular flower pot being particularly shown.

Supporting means are provided to engage a shoulder upon the container 13 so that the supporting means and the projection 12 cooperate to removably retain the container upon the plaque. In the construction illustrated the lower edge of the recess 11 forms a ledge means or ledges 15 to engage the shoulder 16 upon the exterior surface of the flower pot 13. It is clear that the bottom of the container forms a shoulder which is also suitable for the purpose. A channel 17 extends from the bottom of the plaque to the recess to provide space for the curved body of a cylindrical container. The channel therefore divides the lower edge of the recess into a pair of ledges which form the supporting or ledge means for engaging the shoulder of the container. It will be noted that the recess has a vertical dimension approximately the same or a little greater than the vertical dimension between the top of the container and the shoulder 16.

The projection 12 has a thickness less than the thickness of the plaque in order that the top edge of the container may be received between the inside face of the projection and the back face of the plaque. A projection of this thickness and in the described position may be obtained in any desired way. Preferably however a groove 20 extends longitudinally of the plaque on the back face thereof. This groove extends the full length of the plaque merely because the plaque may be formed either by extruding, rolling or forming in any other way, the soft clay into long strips or by pressing them separately. With this method any suitable design may be formed upon the front face of the long strips after which the strips are cut or otherwise formed into the desired plaque pattern or outline and with the recess and projection. With the groove 20 in the back face of the plaque the projection is given a proper thickness and position with sufficient space between the inside face thereof and the back face of the plaque merely by cutting or pressing the recess and projection and without requiring an additional manipulation of the plaque while in its soft clay state. The plaque may have a hole 21 therethrough to receive a suitable hanger for supporting the same and the container to a wall.

The invention is presented to fill a need for improvements in a container holder and combination. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A container holder comprising a plaque of substantial thickness, a recess extending through the plaque, a projection extending from the top of the recess and located between the front and rear faces of the plaque, the projection having a thickness less than that of the plaque, the inside face of the projection being spaced from the back of the plaque, and ledge means below the projection and located between the front and rear faces of the plaque to engage the edge of a container to cooperate with the projection to retain the container upon the plaque.

2. A container holder comprising a plaque of substantial thickness, a recess extending through the plaque and the lower edge of which recess forms ledge means to engage the edge of a container, and a projection extending from the top of the recess and located between the front and rear faces of the plaque, the projection having a thickness less than that of the plaque, the inside face of the projection being spaced from the back of the plaque, the projection and ledge means cooperating together to retain a pot upon the plaque.

3. A container holder comprising a plaque of substantial thickness, a recess extending through the plaque, a groove in the back face of the plaque, a projection extending from the top of the recess and at the groove whereby the projection has a thickness less than that of the plaque and the inside face of the projection being continuous with the bottom of the groove and hence spaced from the back of the plaque, the projection being located between the front and rear faces of the plaque, and ledge means below the projection and between the front and rear faces of the plaque to engage the edge of a container to cooperate with the projection to retain the container upon the plaque.

4. A holder for a container having a shoulder spaced from the top comprising a plaque of substantial thickness, a recess extending through the plaque and having a vertical dimension approximating the distance from the top of the container to its shoulder, a groove in the back face of the plaque, a projection extending from the top of the recess and at the groove whereby the projection has a thickness less than that of the plaque and the inside face of the projection being spaced from the back of the plaque, the projection being located between the front and rear faces of the plaque, and the lower edge of the recess forming ledge means to engage the shoulder of a container to cooperate with the projction to retain the container upon the plaque.

5. A holder for a container comprising a plaque of substantial thickness, a recess extending through the plaque and having a lower edge, a projection extending from the top of the recess and the inside face of the projection being spaced from the back of the plaque, the projection being located between the front and rear faces of the plaque, the lower edge of the recess forming ledge means to engage a shoulder on the container to cooperate with the projection to retain the container upon the plaque, and a channel extending through the plaque and from the bottom of the plaque to the recess.

WILBUR O. DEMUTH.